US009922193B2

United States Patent
Adams et al.

(10) Patent No.: US 9,922,193 B2
(45) Date of Patent: *Mar. 20, 2018

(54) IDENTIFYING AN EVASIVE MALICIOUS OBJECT BASED ON A BEHAVIOR DELTA

(71) Applicant: Juniper Networks, Inc., Sunnyvale, CA (US)

(72) Inventors: Kyle Adams, Brisbane, CA (US); Daniel J. Quinlan, San Francisco, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/455,981

(22) Filed: Mar. 10, 2017

(65) Prior Publication Data

US 2017/0185779 A1   Jun. 29, 2017

Related U.S. Application Data

(63) Continuation of application No. 15/229,842, filed on Aug. 5, 2016, now Pat. No. 9,594,908, which is a (Continued)

(51) Int. Cl.
G06F 21/53    (2013.01)
G06F 21/56    (2013.01)
G06F 11/36    (2006.01)

(52) U.S. Cl.
CPC ........ *G06F 21/566* (2013.01); *G06F 11/3688* (2013.01); *G06F 11/3692* (2013.01); *G06F 21/53* (2013.01); *G06F 2221/034* (2013.01)

(58) Field of Classification Search
CPC ..... H04L 63/14; H04L 63/1441; G06F 21/56; G06F 21/50; G06F 21/566
See application file for complete search history.

(56) References Cited

U.S. PATENT DOCUMENTS 8,290,763 B1   10/2012   Zhang
9,411,959 B2   8/2016    Adams et al.
(Continued)

FOREIGN PATENT DOCUMENTS

CN   101605074 A   12/2009
CN   102930210 A   2/2013
(Continued)

OTHER PUBLICATIONS

Extended European Search Report corresponding to EP Application No. 15 16 0337, dated Feb. 22, 2016, 6 pages.

*Primary Examiner* — Izunna Okeke
(74) *Attorney, Agent, or Firm* — Harrity & Harrity, LLP

(57) ABSTRACT

A security device may receive actual behavior information associated with an object. The actual behavior information may identify a first set of behaviors associated with executing the object in a live environment. The security device may determine test behavior information associated with the object. The test behavior information may identify a second set of behaviors associated with testing the object in a test environment. The security device may compare the first set of behaviors and the second set of behaviors to determine a difference between the first set of behaviors and the second set of behaviors. The security device may identify whether the object is an evasive malicious object based on the difference between the first set of behaviors and the second set of behaviors. The security device may provide an indication of whether the object is an evasive malicious object.

20 Claims, 9 Drawing Sheets

Related U.S. Application Data continuation of application No. 14/502,713, filed on Sep. 30, 2014, now Pat. No. 9,411,959.

(56) References Cited

U.S. PATENT DOCUMENTS

| | | | |
|---|---|---|---|
| 9,594,908 B2 | 3/2017 | Adams et al. | |
| 2013/0145463 A1* | 6/2013 | Ghosh | G06F 21/56 726/22 |
| 2015/0067862 A1* | 3/2015 | Yu | H04L 63/145 726/24 |

FOREIGN PATENT DOCUMENTS

| | | |
|---|---|---|
| CN | 103049696 A | 4/2013 |
| JP | 2014071796 | 4/2014 |

\* cited by examiner

IDENTIFYING AN EVASIVE MALICIOUS OBJECT BASED ON A BEHAVIOR DELTA

BACKGROUND

A security device may be positioned between a user device and a server device (e.g., a server device associated with a web site). The security device may be configured to detect (e.g., using URL reputations, blacklists, anti-virus scanning, anti-malware techniques, etc.) malicious objects (e.g., a Trojan, a worm, a spyware program, a document containing an exploit, etc.), provided by the server device, and may be configured to prevent the malicious objects from being received by the user device.

SUMMARY

According some possible implementations, a security device may comprise one or more processors to: receive actual behavior information associated with an object, where the actual behavior information may identify a first set of behaviors associated with executing the object in a live environment; determine test behavior information associated with the object, where the test behavior information may identify a second set of behaviors associated with testing the object in a test environment; compare the first set of behaviors and the second set of behaviors to determine a difference between the first set of behaviors and the second set of behaviors; identify whether the object is an evasive malicious object based on the difference between the first set of behaviors and the second set of behaviors; and provide an indication of whether the object is an evasive malicious object.

According to some possible implementations, a computer-readable medium may store one or more instructions that, when executed by one or more processors, cause the one or more processors to: determine test behavior information associated with an object, where the test behavior information may identify a test set of behaviors associated with testing the object in a test environment; obtain actual behavior information associated with the object, where the actual behavior information may identify an actual set of behaviors associated with executing or installing the object in a live environment; compare the actual set of behaviors and the test set of behaviors to determine a difference between the actual set of behaviors and the test set of behaviors; determine whether the object as an evasive malicious object based on the difference between the actual set of behaviors and the test set of behaviors; and provide information indicating whether the object is an evasive malicious object.

According to some possible implementations, a method may include: receiving, by a security device, actual behavior information associated with an object, where the actual behavior information may identify a first group of behaviors associated with executing the object on a user device; determining, by the security device, test behavior information associated with the object, where the test behavior information may identify a second group of behaviors associated with testing the object on the security device; determining, by the security device, a difference between the first group of behaviors and the second group of behaviors; identifying, by the security device, the object as an evasive malicious object based on the difference between the first group of behaviors and the second group of behaviors; and providing, by the security device, information associated with identifying the object as an evasive malicious object.

DETAILED DESCRIPTION

The following detailed description of example implementations refers to the accompanying drawings. The same reference numbers in different drawings may identify the same or similar elements.

A security device may attempt to detect a malicious object (e.g., an object that includes malware, a virus, or another type of malicious code) being provided to a user device. However, the security device may be unable to detect the malicious object if the malicious object has been designed to evade detection. One such evasion strategy involves preventing the malicious object from exhibiting any malicious behaviors if the malicious object determines that it is being tested in an emulated environment, a sandbox environment, or the like. For example, the security device may implement a sandbox to test (e.g., analyze, execute, inspect, etc.) an object within a full operating system running on a virtual machine (VM). The test behavior of the object may be profiled and heuristics may be applied in order to determine whether the object is malicious. However, a malicious object may be designed to detect that the malicious object is being tested in the sandbox, and may refrain from exhibiting malicious behavior upon such a detection. As such, the security device may incorrectly determine that the object is not malicious, and the malicious object may be provided to the user device. What is needed is a solution that allows the security device to determine that an object behaves differently when being executed on the user device, as compared to when the object is being tested by the security device (e.g., a difference between actual behavior and test behavior may be indicative that the object is an evasive malicious object).

Implementations described herein may allow a security device to identify an object as an evasive malicious object based on comparing actual behavior information, associated with the object and determined by a user device, and test behavior information associated with the object and determined by the security device.

Figure 1:
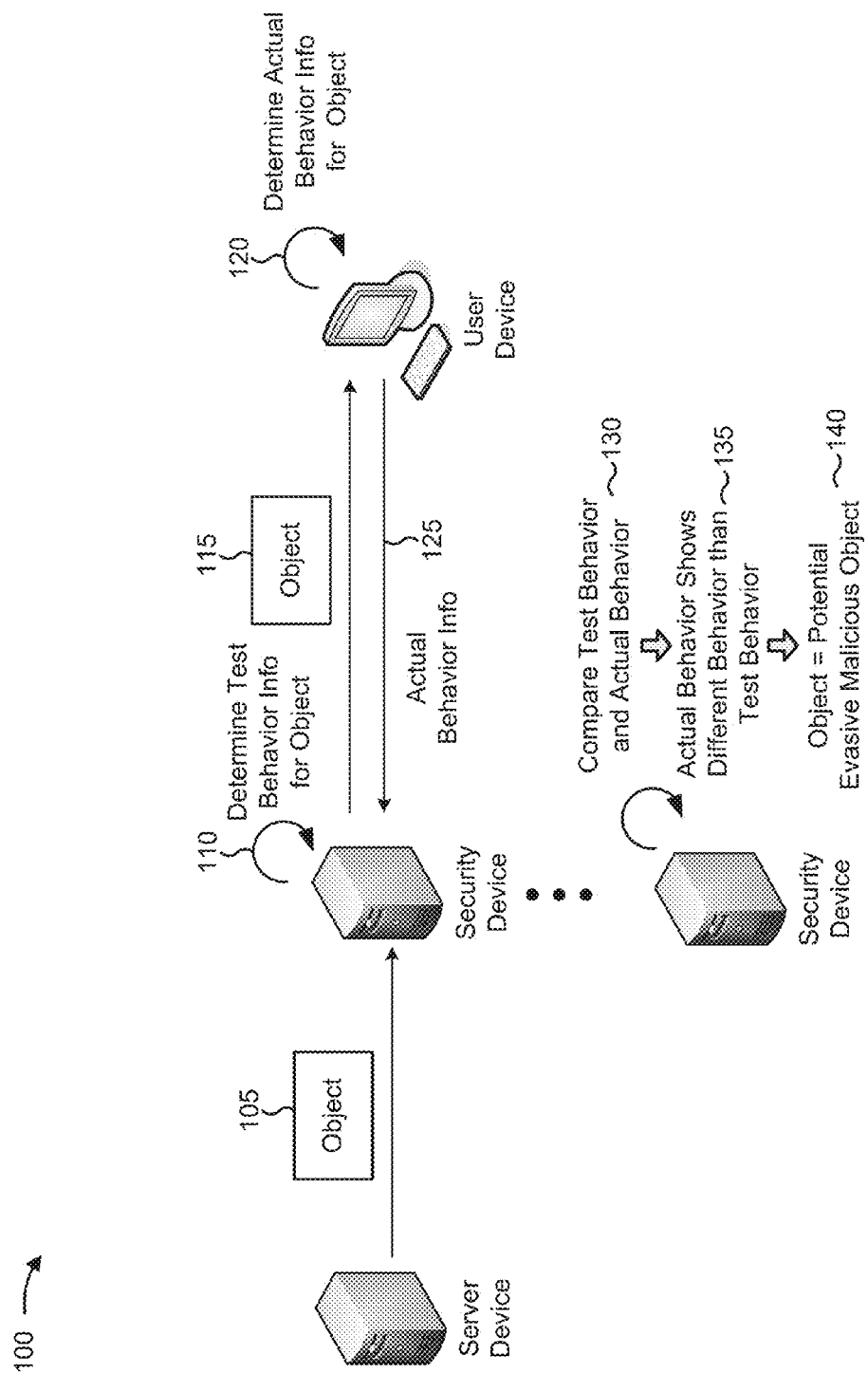
FIG. 1 is a diagram of an overview of an example implementation described herein.

FIG. 1 is a diagram of an overview of an example implementation 100 described herein. For the purposes of example implementation 100, assume that an object is being provided to a user device by a server device e.g., based on a request made by the user device). Further, assume that a security device is positioned between the user device and the server device, and that the security device is configured to detect whether objects being provided to the user device are malicious objects.

As shown in FIG. 1, and by reference number 105, the security device may receive the object provided by the server device. As shown by reference number 110, the security device may then test (e.g., execute, analyze, inspect, etc.) the object in order to determine test behavior information associated with the object. As shown by reference number 115, the security device may provide the object to the user device. As shown by reference number 120, the user may determine (e.g., by executing the object, opening the object, running the object, installing the object, etc.) actual behavior information associated with the object. As shown by reference number 125, the user device may provide the actual behavior information, associated with the object, to the security device.

As shown by reference number 130, the security device may receive the actual behavior information, and may compare the actual behavior information and the test behavior information. As shown by reference number 135, the security device may determine, based on comparing the actual behavior information and the test behavior information, that the actual behavior information differs from the test behavior information (e.g., that the actual behavior information shows a behavior that is not shown in the test behavior information). As shown by reference number 140, based on determining that the actual behavior information differs from the test behavior information, the security device may identify (e.g., by conducting additional analysis of the object; by inputting information associated with the actual behavior, information associated with the test behavior, and/or information with a difference between the actual behavior and the test behavior into a machine learning model trained to classify objects as malicious or benign, etc.) the object as an evasive malicious object, and may act accordingly (e.g., by notifying a user of the user device, etc.).

In this way, a security device may identify an object as an evasive malicious object based on comparing actual behavior information, associated with the object (e.g., determined by a user device), and test behavior information associated with the object (e.g., determined by the security device).

Figure 2:
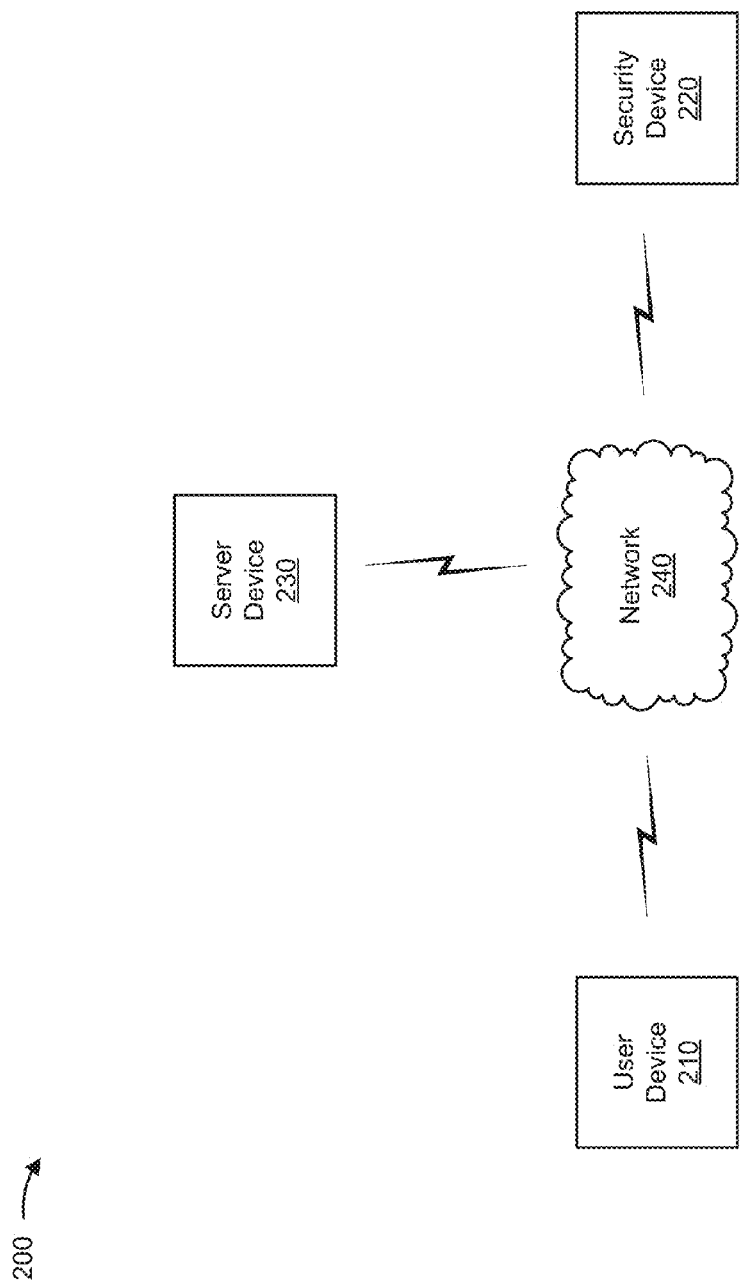
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a security device 220, a server device 230, and a network 240. Devices of environment 200 may interconnect via wired connections, wireless connections, or a combination of wired and wireless connections.

User device 210 may include one or more devices capable of communicating with other devices (e.g., server device 230) via a network (e.g., network 240), and/or capable of receiving information provided by another device (e.g., server device 230). For example, user device 210 may include a computing device, such as a laptop computer, a tablet computer, a handheld computer, a desktop computer, a mobile phone (e.g., a smart phone, a radiotelephone, etc.), a personal digital assistant, or a similar device. In some implementations, user device 210 may host a security client configured to determine actual behavior information associated with an object received by user device 210. Additionally, or alternatively, user device 210 may be capable of providing the actual behavior information to security device 220.

Security device 220 may include one or more devices capable of receiving, generating, determining, providing, and/or storing behavior information (e.g., test behavior information or actual behavior information) associated with an object. For example, security device 220 may include a computing device, such as a server. In some implementations, security device 220 may be capable of determining test behavior information associated with an object. For example, security device 220 may host a sandbox environment that allows security device 220 to execute, analyze, run, install, or the like, an object in order to determine test behavior information associated with the object. Additionally, or alternatively, security device 220 may be capable of determining the test behavior information in another manner.

In some implementations, security device 220 may be capable of identifying whether an object is an evasive malicious object based on test behavior information, associated with the object, and actual behavior information associated with the object. Additionally, or alternatively, security device 220 may include one or more devices capable of processing and/or transferring communications (e.g., a request, a response, etc.) between user device 210 and server device 230. For example, security device 220 may include a network device, such as a reverse proxy, a server (e.g., a proxy server), a traffic transfer device, a firewall, a router, a load balancer, or the like.

Security device 220 may be used in connection with a single server device 230 or a group of server devices 230 (e.g., a data center). Communications may be routed through security device 220 to reach the one or more server devices 230. For example, security device 220 may be positioned within a network as a gateway to a private network that includes one or more server devices 230. Additionally, or alternatively, security device 220 may be used in connection with a single user device 210 or a group of user devices 210. Communications may be routed through security device 220 to reach the one or more user devices 210. For example, security device 220 may be positioned within a network as a gateway to a private network that includes one or more user devices 210.

Server device 230 may include one or more devices capable of receiving, providing, generating, storing, and/or processing information associated with an object. For example, server device 230 may include a computing device, such as a server (e.g., an application server, a content server, a host server, a web server, etc.).

Network 240 may include one or more wired and/or wireless networks. For example, network 240 may include a wireless local area network (WLAN), a local area network (LAN), a wide area network (WAN), a metropolitan area network (MAN), a telephone network (e.g., the Public Switched Telephone Network (PSTN)), a cellular network, a public land mobile network (PLMN), an ad hoc network, an intranet, the Internet, a fiber optic-based network, or a combination of these or other types of networks. In some implementations, network 240 may allow communication between devices, such as user device 210, server device 230, and/or security device 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
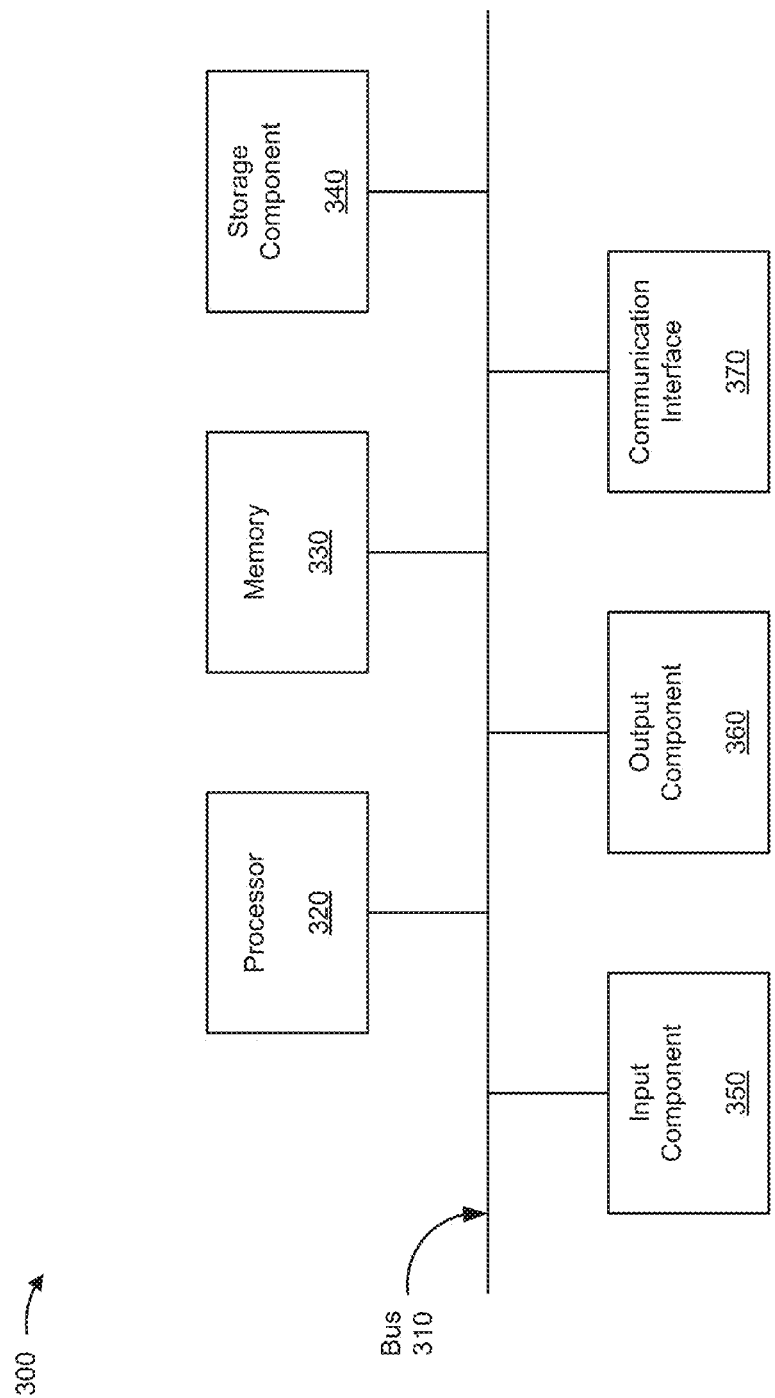
FIG. 3 is a diagram of example components of one or more devices of FIG. 2.

FIG. 3 is a diagram of example components of a device 300. Device 300 may correspond to user device 210, security device 220, and/or server device 230. In some implementations, user device 210, security device 220, and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU)), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein: are of limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
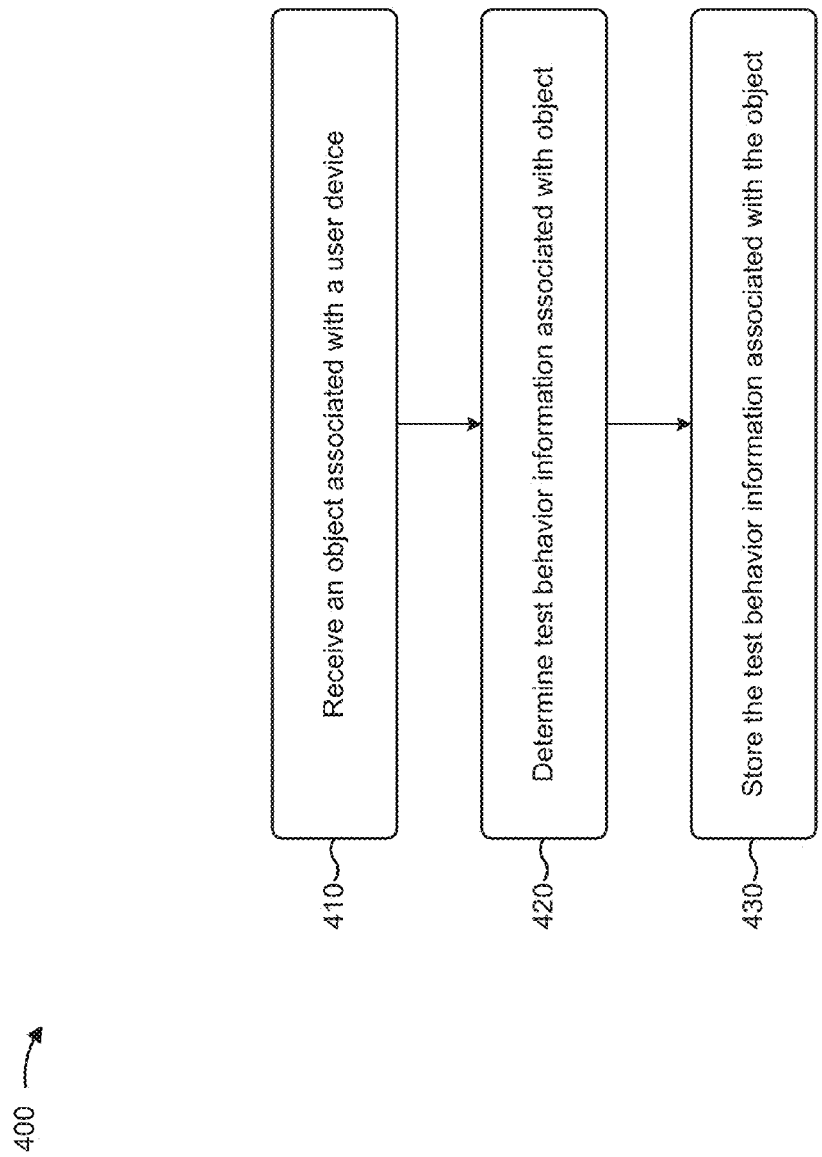
FIG. 4 is a flow chart of an example process for determining test behavior information associated with an object, and storing the test behavior information associated with the object.

FIG. 4 is a flow chart of an example process 400 for determining test behavior information associated with an object, and storing the test behavior information associated with the object. In some implementations, one or more process blocks of FIG. 4 may be performed by security device 220. In some implementations, one or more process blocks of FIG. 4 may be performed by another device or a group of devices separate from or including security device 220, such as user device 210.

As shown in FIG. 4, process 400 may include receiving an object associated with a user device (block 410). For example, security device 220 may receive an object associated with user device 210. In some implementations, security device 220 may receive the object when server device 230 provides the object for transmission to user device 210 (e.g., when security device 220 is positioned to receive objects provided to user device 210). Additionally, or alternatively, security device 220 may receive the object when another device provides the object to security device 220, such as user device 210 or a device included in network 240.

An object may include an executable object (e.g., a Windows executable file (EXE), a Windows script file (WSF), etc.), a web page object (e.g., a hypertext markup language (HTML) document, etc.), a text object (e.g., a Microsoft Word document (DOC), a plain text file (TXT)), a page layout object (e.g., a portable document format file (PDF), a picture file (PCT)), a compressed object (e.g., a zipped file (ZIP), a WinRAR compressed archive (RAR), etc.), or another type of object.

In some implementations, security device 220 may receive the object based on a request provided by user device 210. For example, a user of user device 210 may provide (e.g., via an input mechanism of user device 210) information that indicates that user device 210 is to receive the object, and user device 210 may send a request to server device 230 (e.g., when server device 230 stores the object). In this example, server device 230 may receive the request, and may provide the object to security device 220 (e.g., when security device 220 is positioned to receive the object before the object is sent to user device 210). In some implementations, the user may be unaware that user device 210 has sent a request for the object (e.g., when a program running on user device 210 is configured to automatically cause user device 210 to request an object, etc.). In some implementations, security device 220 may receive the object based on the object being provided by server device 230. For example, server device 230 may send the object to user device 210 (e.g., without user device 210 requesting the object), and security device 220 may receive the object from server device 230.

Additionally, or alternatively, security device 220 may receive the object from user device 210. For example, user device 210 may receive the object from server device 230, and may determine actual behavior information, associated with the object, as described below. In this example, user device 210 may provide the object to security device 210 along with the actual behavior information (e.g., in order to allow security device 220 to determine test behavior information associated with the object).

As further shown in FIG. 4, process 400 may include determining test behavior information associated with the object (block 420). For example, security device 220 may determine test behavior information associated with the object. In some implementations, security device 220 may determine the test behavior information after security device 220 receives the object. Additionally, or alternatively, security device 220 may determine the test behavior information when security device 220 receives an indication that security device 220 is to determine the test behavior information.

Test behavior information may include information that identifies one or more behaviors associated with testing an object in a test environment (e.g., a sandbox environment, an emulated environment, an environment hosted by a VM, etc.). In some implementations, the test behavior information may be compared to actual behavior information in order to identify the object as an evasive malicious object, as described below. In some implementations, security device 220 may determine the test behavior information based on executing the object in an emulated environment. For example, security device 220 may implement a sandbox environment within a full operating system running a VM. Here, security device 220 may execute the object in the sandbox environment in order to determine the test behavior information. Testing the object in a test environment may allow security device 220 to perform dynamic analysis of the object (e.g., in order to determine whether the object is a malicious object) without risking any malicious activities occurring on user device 210.

Additionally, or alternatively, security device 220 may determine the test behavior by performing a static analysis of the object, such as scanning the object with anti-virus software, performing a strings search of the object, disassembling the object, or the like. Additionally, or alternatively, security device 220 may determine the test behavior information in another manner associated with analyzing, executing, inspecting, running, installing or otherwise testing the object.

Additionally, or alternatively, security device 220 may determine the test behavior based on information associated with another user device 210. For example, a first user device 210 may provide, to security device 220, actual behavior information, associated with the object, at an earlier time (e.g., when the first user device 210 received the object at an earlier time). In this example, security device 220 may determine (e.g., based on the actual behavior information, and based on test behavior information determined by security device 220), that the object is an evasive malicious object. Security device 220 may store an indication that the object is an evasive malicious object and/or may store the test behavior information associated with the object. Here, security device 220 may retrieve the indication and/or the test behavior information when security device 220 is to determine test behavior information based on the second user device 210 receiving the object (e.g., at a later time). In this way, security device 220 may use the previously determined test behavior information and/or may identify the object as an evasive malicious object based on the stored indication associated with the object.

In some implementations, the test behavior information may indicate that the object is a malicious object. For example, security device 220 may execute the object within a sandbox environment, and may identify one or more malicious and/or suspicious behaviors associated with executing the object, such as a creation of a file, an edit of a file, a creation of a registry key, an edit of a registry key, a deletion of a registry key, a scheduling of an automated task, an establishment of a network connection, or the like. In this example, security device 220 may determine, based on the test behavior information and/or based on performing additional analysis of the object (e.g., using another malware detection technique, virus detection technique, spyware detection technique, ransomware detection technique, etc.), that the object is a malicious object. In some implementations, security device 220 may not permit the object to be provided to user device 210 (e.g., when the test behavior information is sufficient to allow security device 220 to conclusively (with a particular degree of certainty) determine that the object is malicious). Alternatively, security device 220 may permit the object to be provided to user device 210 even when security device 220 identifies the one or more malicious and/or suspicious behaviors (e.g., when the test behavior information is not sufficient to allow security device 220 to determine that the object is malicious).

Alternatively, the test behavior information may indicate that the object is not a malicious object. For example, security device 220 may execute the object within the sandbox environment, and may not identify malicious and/or suspicious behaviors associated with executing the object (i.e., the object may not cause any suspicious and/or malicious behaviors to be exhibited). Here, security device 220 may determine test behavior information that identifies one or more normal behaviors (e.g., non-malicious behaviors, non-suspicious behaviors, typical behaviors, expected behaviors, etc.). In this example, security device 220 may determine, based on the test behavior information and/or based on performing additional analysis of the object (e.g., using another malware detection technique, virus detection technique, spyware detection technique, ransomware detection technique, etc.), that the object is not a malicious object, and may permit the object to be provided to user device 210. In some implementations, security device 220 may provide the object to user device 210 (e.g., after security device 220 determines the test behavior information, before security device 220 determines the test behavior information, concurrently with security device 220 determining the test behavior information, etc.). Additionally, or alternatively, security device 220 may provide information indicating that user device 210 is to determine actual behavior information, associated with the object, and provide the actual behavior information to security device 220.

In some implementations, security device 220 may provide the test behavior information, associated with the object, to user device 210 (e.g., such that user device 210 may determine when actual behavior information, associated with the object, deviates from the test behavior information, as described below).

As further shown in FIG. 4, process 400 may include storing the test behavior information associated with the object (block 430). For example, security device 220 may store the test behavior information associated with the object. In some implementations, security device 220 may store the test behavior information when security device 220 determines the test behavior information (e.g., after security device 220 determines the test behavior information). Additionally, or alternatively, security device 220 may store the test behavior information based on receiving an indication that security device 220 is to store the test behavior information.

In some implementations, security device 220 may store the test behavior information in a memory location (e.g., a RAM, a ROM, a cache, a hard disk, etc.) of security device 220. In some implementations, security device 220 may store the test behavior information in a test behavior information data structure stored or accessible by security device 220. Additionally, or alternatively, security device 220 may provide the test behavior information to another device for storage.

In some implementations, security device 220 may store the test behavior information such that security device 220 may retrieve the test behavior information at a later time. In some implementations, security device 220 may store the test behavior information with respect to user device 210. Additionally, or alternatively, security device 220 may store the test behavior information with respect to the object.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
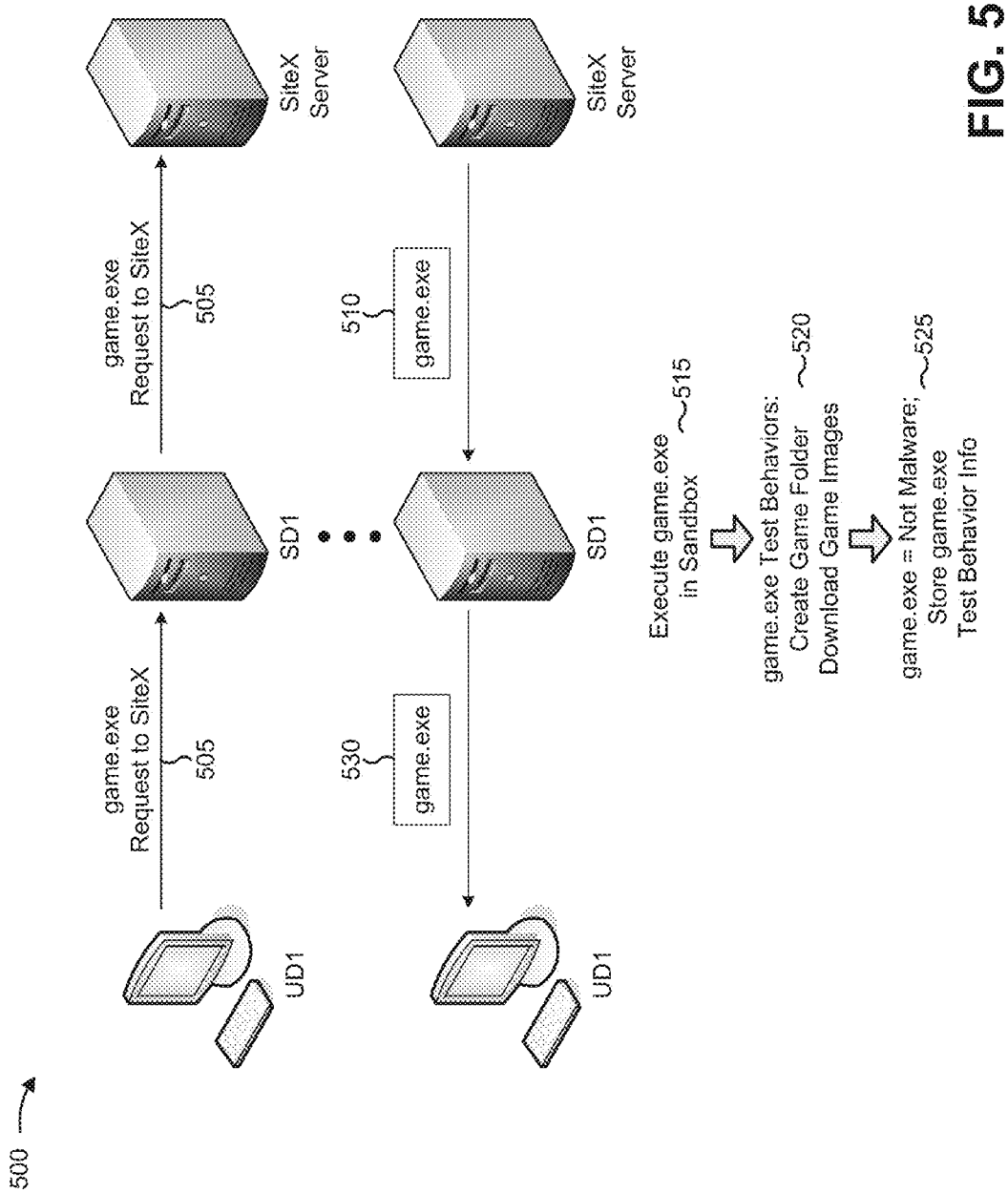
FIG. 5 is a diagram of an example implementation relating to the example process shown in FIG. 4.

FIG. 5 is a diagram of an example implementation 500 relating to example process 400 shown in FIG. 4. For the purposes of FIG. 5, assume that security device 220 (e.g., SD1) is positioned between user device 210 (e.g., UD1) and server device 230 (e.g., SiteX server). Further, assume that SD1 is configured to determine test behavior information associated with objects to be provided to UD1.

As shown in FIG. 5, and by reference number 505, UD1 may send, to the SiteX server via SD1, a request for an object (e.g., game.exe) stored by the SiteX server. As shown by reference number 510, the SiteX server may provide the object to SD1 based on the request provided by UD1. As shown by reference number 515, SD1 may receive the object and may execute the object in a sandbox environment hosted by SD1. As shown by reference number 520, SD1 may identify two behaviors based on executing the object (e.g., a creation a game folder associated with game.exe and a download of image files associated with game.exe). As shown by reference number 525, SD1 may determine that the two behaviors are normal behaviors (e.g., non-malicious, non-suspicious, etc.), that the object is not a malicious object, and SD1 may store test behavior information associated with the object. As shown by reference number 530, SD1 may then provide the object to UD1.

As indicated above, FIG. 5 is provided merely as an example. Other examples are possible and may differ from what was described with regard to FIG. 5.

Figure 6:
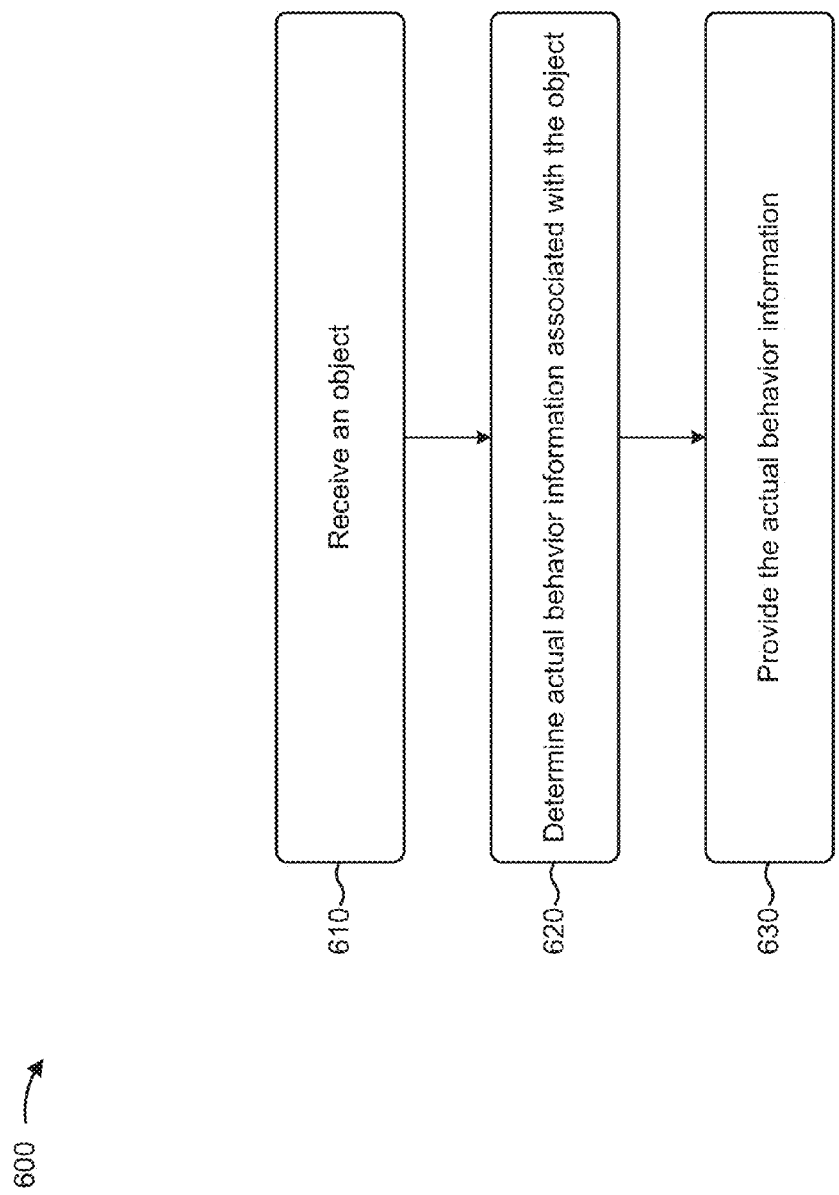
FIG. 6 is a flow chart of an example process for determining actual behavior information, associated with an object, and providing the actual behavior information.

FIG. 6 is a flow chart of an example process 600 for determining actual behavior information, associated with an object, and providing the actual behavior information. In some implementations, one or more process blocks of FIG. 6 may be performed by user device 210. In some implementations, one or more process blocks of FIG. 6 may be performed by another device or a group of devices separate from or including user device 210, such as security device 220.

As shown in FIG. 6, process 600 may include receiving an object (block 610). For example, user device 210 may receive an object. In some implementations, user device 210 may receive the object when security device 220 provides the object. Additionally, or alternatively, user device 210 may receive the object when server device 230 provides the object (e.g., based on a request from user device 210). Additionally, or alternatively, user device 210 may receive the object from another device and/or at another time.

In some implementations, user device 210 may receive the object after security device 220 determines test behavior information associated with the object. In other words, user device 210 may receive the object after process 400 (described above) is performed by security device 220 (e.g., when security device 220 is configured to determine the test behavior information before user device 210 receives the object). Alternatively, user device 210 may receive the object before security device 220 determines test behavior information associated with the object. In other words, user device 210 may receive the object before process 400 is performed by security device 220 (e.g., when security device 220 is configured to determine the test behavior information after user device 210 receives the object and/or provides the object to security device 220). Alternatively, user device 210 may receive the object concurrently with security device 220 determining test behavior information associated with the object.

As further shown in FIG. 6, process 600 may include determining actual behavior information associated with the object (block 620). For example, user device 210 may determine actual behavior information associated with the object. In some implementations, user device 210 may determine the actual behavior information after user device 210 receives the object. Additionally, or alternatively, user device 210 may determine the actual behavior information when user device 210 receives an indication (e.g., user input) to execute the object, run the object, open the object, install the object, or the like. Additionally, or alternatively, user device 210 may determine the actual behavior information when user device 210 receives an indication that user device 210 is to determine the actual behavior information.

Actual behavior information may include information that identifies one or more behaviors exhibited by an object within a live environment (e.g., when the object is executed on user device 210, run on user device 210, opened by user device 210, installed on user device 210, etc.). In some implementations, user device 210 may determine the actual behavior information by executing the object, running the object, opening the object, or the like, in a live environment associated with user device 210 and monitoring the behavior of the object. In some implementations, the actual behavior information may be compared to test behavior information in order to identify the object as an evasive malicious object, as described below.

In some implementations, user device 210 may determine the actual behavior information based on an indication from the user. For example, user device 210 may be configured to (e.g., automatically) determine actual behavior information, associated with the object, when the user provides input indicating that user device 210 is to execute the object.

Additionally, or alternatively, user device 210 may determine the actual behavior information based on a configuration of user device 210. For example, user device 210 may be configured (e.g., based on a security application hosted by user device 210) to determine the actual behavior information when user device 210 executes the object, runs the object, opens the object, installs the object, or the like.

Additionally, or alternatively, user device 210 may determine the actual behavior based on an indication provided by security device 220. For example, security device 220 may provide the object to user device 210 along with an indication that user device 210 is to determine the actual behavior information, associated with the object (e.g., as described above), and user device 210 may determine the actual behavior information accordingly.

As further shown in FIG. 6, process 600 may include providing the actual behavior information (block 630). For example, user device 210 may provide the actual behavior information. In some implementations, user device 210 may provide the actual behavior information after user device 210 determines the actual behavior information. Additionally, or alternatively, user device 210 may provide the actual behavior information when user device 210 receives information indicating that user device 210 is to provide the actual behavior information.

In some implementations, user device 210 may provide the actual behavior information based on a threshold amount of time. For example, user device 210 may store information indicating that user device 210 is to determine actual behavior information for a threshold amount of time (e.g., 30 seconds, five minutes, etc.) after user device 210 begins executing the object, and user device 210 may determine and provide the actual behavior information accordingly. Additionally, or alternatively, user device 210 may periodically provide the actual behavior information (e.g., every 1 minute while the object is open, every 10 minutes while the object is running, etc.).

In some implementations, user device 210 may provide the actual behavior information based on detecting a deviation from test behavior information associated with the object. For example, security device 220 may provide the test behavior information to user device 210 (e.g., when security device 210 is configured to determine the test behavior information before providing the object to user device 210). Here, user device 210 may receive the test behavior information and may begin determining the actual behavior information (e.g., user device 210 may begin executing the object and monitoring behaviors associated with executing the object). In this example, user device 210 may determine (e.g., at a time after user device 210 begins to execute the object), that the actual behavior information has deviated from the test behavior information (e.g., when user device 210 identifies, during execution, a behavior that is not identified in the test behavior information), and user device 210 may provide the actual behavior information to security device 220.

In some implementations, user device 210 may provide the object along with the actual behavior information. For example, user device 210 may receive the object before security device 220 determines test behavior information associated with the object, and user device 210 may execute the object. Here, user device 210 may provide, to security device 220, the actual behavior information along with the object (e.g., such that security device 220 may execute the object in a test environment (e.g., a sandbox environment, an emulated environment, using a VM hosted by security device 220, etc.) in order to determine test behavior information associated with the object).

Additionally, or alternatively, user device 210 may provide information associated with one or more user actions associated with the object. For example, user device 210 may provide information associated with user input (e.g., a username, a password, a selection of a particular button, a selection of a particular area of a user interface, etc.) provided by the user and associated with the object (e.g., such that security device 210 may re-create the one or more user actions in order to perform additional testing associated with the object). Additionally, or alternatively, user device 210 may provide a memory snapshot associated with the object. For example, user device 210 may provide information associated with memory space of a process that is running on user device 210 (e.g., such that security device 220 may re-establish a matching memory space within a sandbox environment in order to perform additional testing associated with the object).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
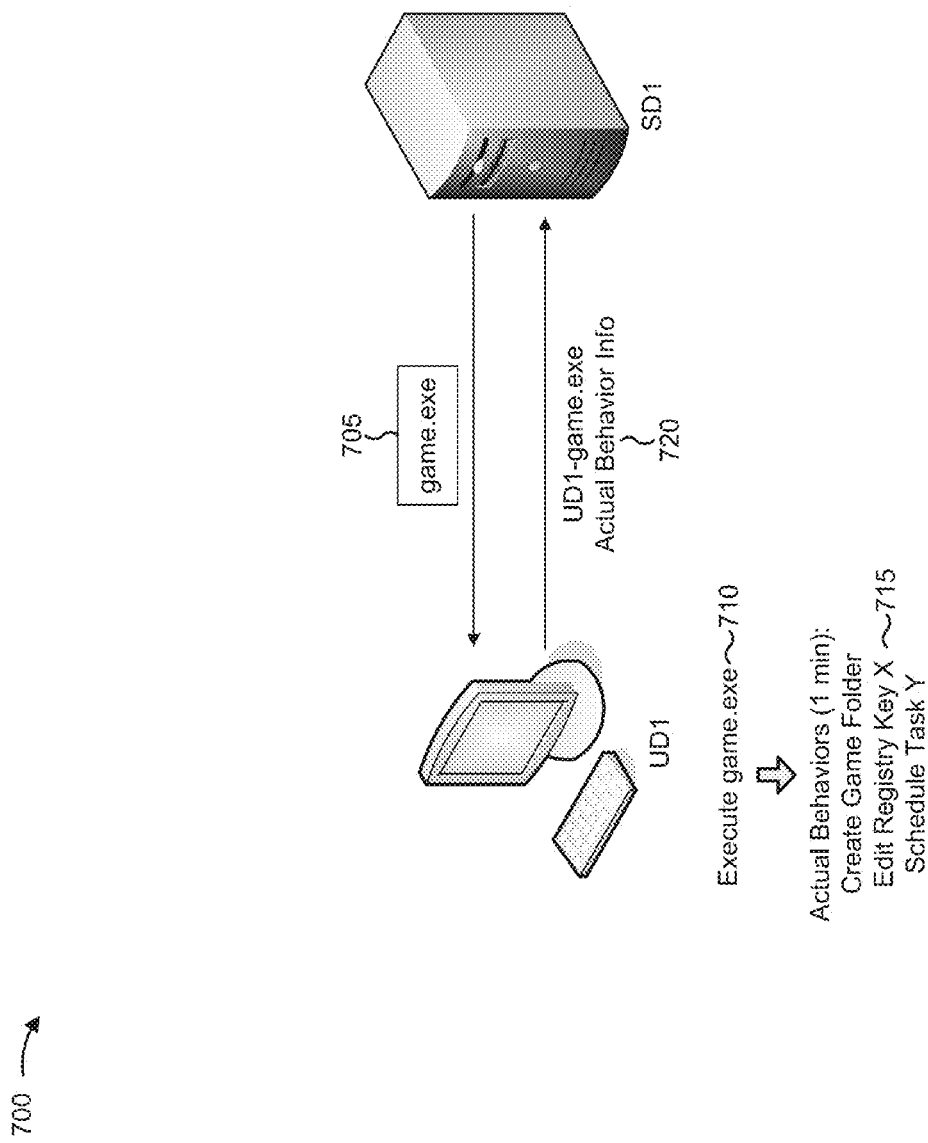
FIG. 7 is a diagram of an example implementation relating to the example process shown in FIG. 6.

FIG. 7 is a diagram of an example implementation 700 relating to example process 600 shown in FIG. 6. For the purposes of FIG. 7, assume that user device 210 (e.g., UD1) has requested an object (e.g., game.exe) from server device 230 (e.g., SiteX server). Further, assume that security device 220 (e.g., SD1), positioned between UD1 and the SiteX server, has received the object, determined and stored test behavior information associated with the object, and has determined (e.g., based on the test behavior information) that the UD1 may receive the object. Finally, assume that UD1 is configured to determine actual behavior information, associated with the object, and provide the actual behavior information to SD1.

As shown in FIG. 7, and by reference number 705, SD1 may provide the object to UD1. As shown by reference number 710, UD1 may receive the object, and may (e.g., based on an indication from the user) execute the object. As shown by reference number 715, UD1 may determine actual behavior information, associated with the object, during a one minute period of time after UD1 begins executing the object (e.g., assume that UD1 is configured to provide the actual behavior information one minute after beginning execution of the object). As shown, UD1 may determine actual behavior information that identifies three behaviors associated with executing the object (e.g., a creation of a game folder associated with game.exe, an edit of registry key Y, and a scheduling of task X). As shown by reference number 720, UD1 may provide the actual behavior information, associated with the object and determined by UD1, to SD1.

As indicated above, FIG. 7 is provided merely as an example. Other examples are possible and may differ from what was described with regard to FIG. 7.

Figure 8:
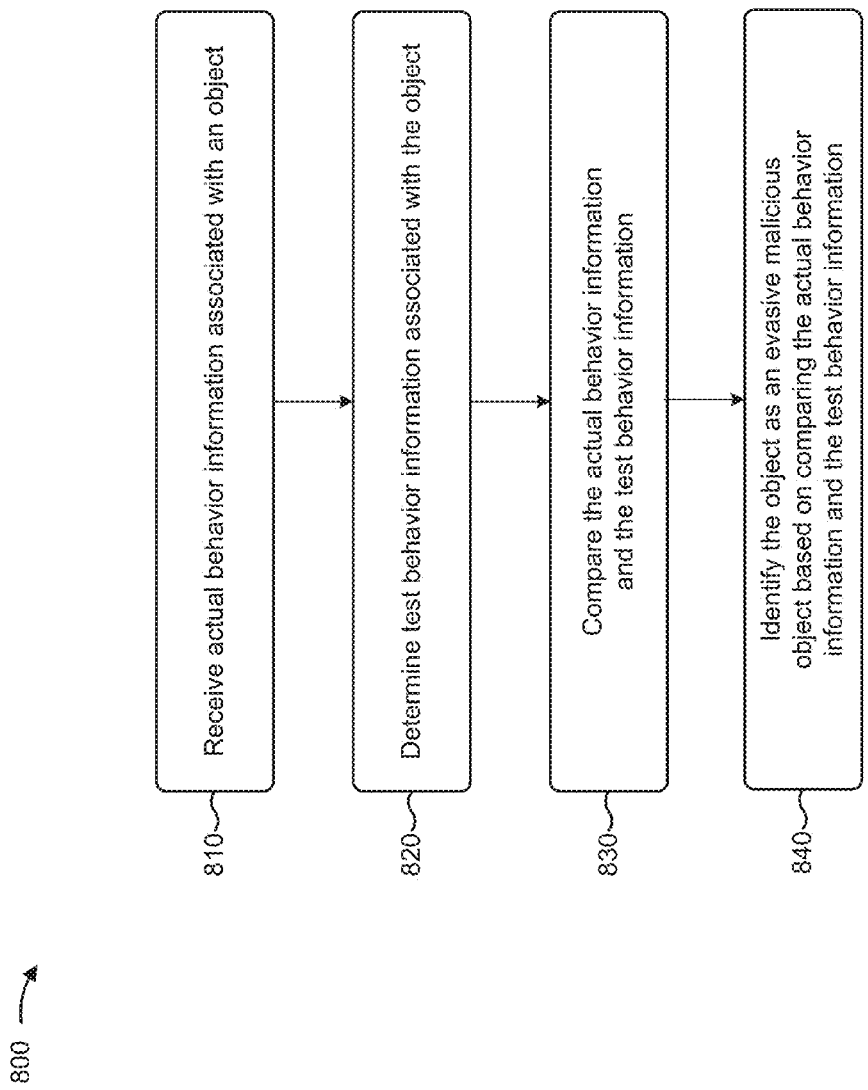
FIG. 8 is a flow chart of an example process for identifying an object as an evasive malicious object based on comparing actual behavior information, associated with the object, and the test behavior information associated with the object.

FIG. 8 is a flow chart of an example process 800 for identifying an object as an evasive malicious object based on comparing actual behavior information, associated with the object, and the test behavior information associated with the object. In some implementations, one or more process blocks of FIG. 8 may be performed by security device 220. In some implementations, one or more process blocks of FIG. 8 may be performed by another device or a group of devices separate from or including security device 220, such as user device 210.

As shown in FIG. 8, process 800 may include receiving actual behavior information associated with an object (block 810). For example, security device 220 may receive actual behavior information associated with an object. In some implementations, security device 220 may receive the actual behavior information, associated with the object, when user device 210 provides the actual behavior information, as described above with regard to process 600.

In some implementations, security device 220 may receive the actual behavior information based on a configuration of user device 210 (e.g., when user device 210 is configured to provide the actual behavior information at a particular time, at particular intervals of time, etc.). Additionally, or alternatively, security device 220 may receive the actual behavior information based on a request provided by security device 220 (e.g., when security device 220 requests the actual behavior information from user device 210). Additionally, or alternatively, security device 220 may receive the actual behavior information at another time.

As further shown in FIG. 8, process 800 may include determining test behavior information associated with the object (block 820). For example, security device 220 may determine test behavior information associated with the object. In some implementations, security device 220 may determine the test behavior information after security device 220 receives the actual behavior information. Additionally, or alternatively, security device 220 may determine the test behavior information when security device 220 receives the object (e.g., as described above). Additionally, or alternatively, security device 220 may determine the test behavior information when security device 220 receives information indicating that security device 220 is to determine the test behavior information.

In some implementations, security device 220 may determine the test behavior information, associated with the object, based on information stored by security device 220. For example, security device 220 may determine and store the test behavior information, as described above with regard to process 400, and may determine the test behavior information based on the stored information.

Additionally, or alternatively, security device 220 may determine the test behavior information based on testing the object (e.g., when security device 220 did not test the object before user device 210 received the object). In other words, security device 220 may perform process 400 after user device 210 provides the actual behavior information associated with the object.

As further shown in FIG. 8, process 800 may include comparing the actual behavior information and the test behavior information (block 830). For example, security device 220 may compare the actual behavior information and the test behavior information. In some implementations, security device 220 may compare the actual behavior information and the test behavior information after security device 220 determines the test behavior information. Additionally, or alternatively, security device 220 may compare the actual behavior information and the test behavior information after security device 220 receives the actual behavior information. Additionally, or alternatively, security device 220 may compare the actual behavior information and the test behavior information after security device 220 receives information indicating that security device 220 is to compare the actual behavior information and the test behavior information.

In some implementations, security device 220 may compare the actual behavior information and the test behavior information in order to determine whether the object behaved differently when tested by security device 220 as compared to being executed, run, opened, installed, or the like, by user device 210 (e.g., a difference between the actual behavior information and the test behavior information may indicate that the object is an evasive malicious object). In some implementations, security device 220 may identify a difference between the actual behavior information and the test behavior information based on comparing the actual behavior information and the test behavior information. For example, security device 220 may determine that the actual behavior information identifies a behavior that is not identified in the test behavior information, that the test behavior information identifies a behavior that is not identified in the actual behavior information, that the actual behavior information identifies a different behavior than a behavior identified in the test behavior information, or the like. In some implementations, security device 220 may identify one or more differences between the actual behavior information and the test behavior information.

As further shown in FIG. 8, process 800 may include identifying the object as an evasive malicious object based on comparing the actual behavior information and the test behavior information (block 840). For example, security device 220 may identify an object as an evasive malicious object based on comparing the actual behavior information and the test behavior information. In some implementations, security device 220 may identify the object as an evasive malicious object after security device 220 compares the actual behavior information and the test behavior information. In some implementations, security device 220 may identify the object as an evasive malicious object when security device 220 receives information indicating that security device 220 is to identify the object as an evasive malicious object.

In some implementations, security device 220 may identify the object as an evasive malicious object based on comparing the actual behavior information and the test behavior information. For example, security device 220 may compare the actual behavior information and the test behavior information, and may determine that the object exhibited one or more malicious behaviors on user device 210, and that the object did not exhibit the one or more malicious behaviors on security device 220 (e.g., during testing of the object in a sandbox environment). In this example, security device 220 may identify the object as an evasive malicious object based on determining that the object exhibited the one or more malicious behaviors on user device 210 then security device 220 is configured to identify an object as an evasive malicious object when the object exhibits one or more malicious behaviors on user device 210, but does not exhibit the one or more malicious behaviors on security device 220).

Additionally, or alternatively, security device 220 may identify the object as an evasive malicious object based on additional testing associated with the object. For example, security device 220 may compare the actual behavior information and the test behavior information, and may determine that the object exhibited a malicious behavior on user device 210, and that the object did not exhibit the malicious behavior on security device 220. In this example, assume that security device 220 has received, from user device 210, information associated with one or more user actions associated with executing the object. Here, security device 220 may use the information associated with the one or more user actions in order to re-create the execution of the object on user device 210, and security device 220 may perform additional testing of the object (e.g., using another malware detection technique, virus detection technique, spyware detection technique, ransomware detection technique, etc.) in order to determine whether the object is an evasive malicious object.

Additionally, or alternatively, security device 220 may identify the object as a malicious object based a manner in which the actual behavior information differs from the test behavior information. For example, if the object exhibits a behavior that includes a first feature creation of a file in a recycle bin) and an associated second feature (e.g., causing the file to be automatically executed) on client device 210, and does not exhibit the first feature or the second feature on security device 220, then security device 220 may identify the object as an evasive malicious object. In other words, the exhibited behaviors may be broken down into features, and security device 220 may determine (e.g., based on static rules stored by security device 220, based on dynamic rules determined by security device 220 using a machine learning technique, etc.) whether the object is an evasive malicious object.

In some implementations, security device 220 may provide an indication after identifying the object as an evasive malicious object. For example, security device 220 may identify the object as an evasive malicious object, and security device 220 may provide to an administrator device associated with user device 210, to user device 210, etc.) a notification that user device 210 has received an evasive malicious object. As another example, security device 220 may identify the object as an evasive malicious object, and may remove user device 210 from network 240 (e.g., such that user device 210 cannot infect other user devices 210 with the evasive malicious object). As yet another example, security device 220 may cause the evasive malicious object to be removed from user device 210. Additionally, or alternatively, security device 220 may take another type of corrective action associated with the object and/or user device 210. For example, security device 220 may notify a firewall to filter objects that are similar to the object, may add information associated with the object to a blacklist, or the like.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9:
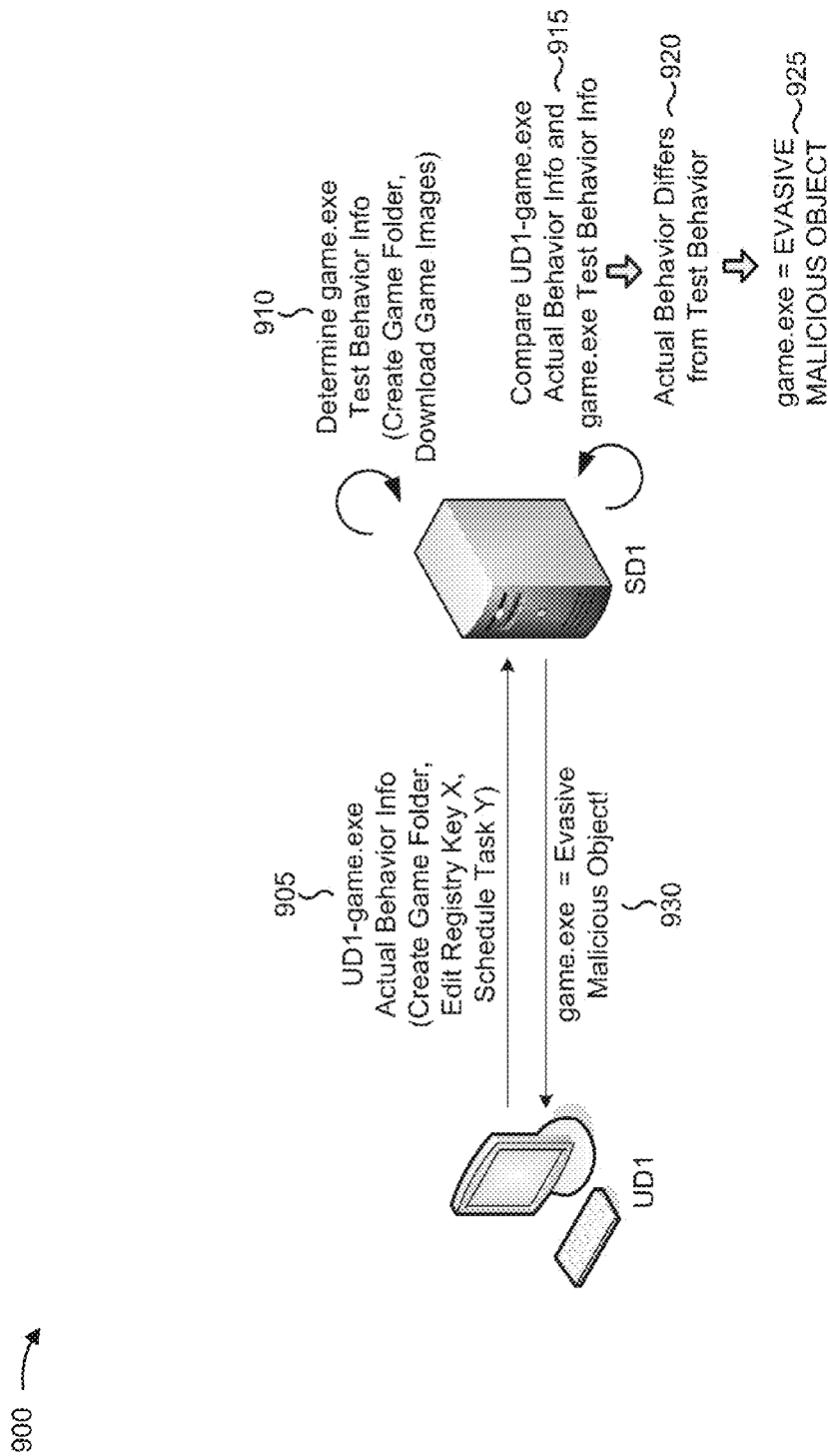
FIG. 9 is a diagram of an example implementation relating to the example process shown in FIG. 8.

FIG. 9 is a diagram of an example implementation 900 relating to example process 800 shown in FIG. 8. For the purposes of FIG. 9, assume that security device 220 (e.g., SD1) has determined and stored test behavior information, associated with an object (e.g., game.exe), that identifies two behaviors (e.g., a creation of a game folder and a download of game images) associated with testing the object in a test environment (e.g., a sandbox environment). Further, assume that user device 210 (e.g., UD1) has received the object and determined actual behavior, associated with the object, that identifies three behaviors (e.g., a creation of a game folder, an edit of registry key X, and a scheduling of task Y) associated with executing the object on UD1.

As shown in FIG. 9, and by reference number 905, UD1 may provide, to SD1, the actual behavior information associated with the object. As shown by reference number 910, SD1 may receive the actual behavior information, and may determine (e.g., based on information stored by SD1) the test behavior information associated with the object. As shown by reference number 915, SD1 may compare the actual behavior information and the test behavior information and, as shown by reference number 920, may determine that the actual behavior information differs from the test behavior information (e.g., since the test behavior information does not identify a behavior associated with editing registry key X or scheduling task Y, and since the test behavior information does not identify a behavior associated with downloading game image files). For the purposes of example implementation 900, assume that SD1 is configured to identify an edit of a registry key as a malicious behavior and a scheduling of a task as a malicious behavior. As shown by reference number 925, SD1 may identify the object as an evasive malicious object (e.g., since the actual behavior information identifies two malicious behaviors not included in the test behavior information). As shown by reference number 930, SD1 may provide, to UD1, an indication that the object is an evasive malicious object (e.g., such that the user may delete the object, stop executing the object, etc.).

As indicated above, FIG. 9 is provided merely as an example. Other examples are possible and may differ from what was described with regard to FIG. 9.

Implementations described herein may allow a security device to determine whether an object is an evasive malicious object based on comparing actual behavior information, associated with the object and determined by a user device, and test behavior information associated with the object and determined by the security device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device comprising:
one or more processors, at least partially implemented in hardware, to:
receive an object;
execute the object in a test environment;
determine, based on executing the object in the test environment, first behavior information associated with the object;
receive, based on at least one of opening, executing, running, or installing the object on a user device, second behavior information associated with the object,
the second behavior information identifying a behavior exhibited by the object when the object is at least one of opened, executed, run, or installed on the user device,
the second behavior information being determined for a threshold period of time, and
the second behavior information being received based on a deviation from the first behavior information being detected;
determine whether the first behavior information identifies the behavior;
determine that the object is a malicious object based on determining that the first behavior information does not identify the behavior and based on the second behavior information being different from the first behavior information; and
provide an indication that the object is the malicious object based on determining that the object is the malicious object.

2. The device of claim 1, where the one or more processors, when receiving the second behavior information, are to:
receive the second behavior information from the user device.

3. The device of claim 1, where the one or more processors, when determining the first behavior information, are to:
determine the first behavior information based on stored information.

4. The device of claim 1, where the one or more processors, when determining the first behavior information, are to:
determine the first behavior information after receiving the second behavior information.

5. The device of claim 1, where the one or more processors are further to:
receive information associated with a user action associated with executing the object; and
where the one or more processors, when executing the object, are to:
execute the object based on receiving the information associated with the user action.

6. The device of claim 1, where the one or more processors are further to:
remove the user device from a network based on determining that the object is the malicious object.

7. A non-transitory computer-readable medium storing instructions, the instructions comprising:
one or more instructions that, when executed by one or more processors, cause the one or more processors to:
receive an object;
execute the object in a test environment;
determine, based on executing the object in the test environment, first behavior information associated with the object;
receive, based on at least one of opening, executing, running, or installing the object on a user device, second behavior information associated with the object,
the second behavior information identifying a behavior exhibited by the object when the object is at least one of opened, executed, run, or installed on the user device,
the second behavior information being determined for a threshold period of time, and
the second behavior information being received based on a deviation from the first behavior information being detected;
determine whether the first behavior information identifies the behavior;
determine that the object is a malicious object based on determining that the first behavior information does not identify the behavior and based on the second behavior information being different from the first behavior information; and
provide an indication that the object is the malicious object based on determining that the object is the malicious object.

8. The non-transitory computer-readable medium of claim 7, where the object includes at least one of:
an executable object;
a script file;
a web page object;
a text object;
a text file;
a page layout object;
a compressed object; or
a compressed archive.

9. The non-transitory computer-readable medium of claim 7, where the one or more instructions, that cause the one or more processors to receive the object, cause the one or more processors to:
receive the object based on the object being sent to the user device.

10. The non-transitory computer-readable medium of claim 7, where the one or more instructions, that cause the one or more processors to receive the object, cause the one or more processors to:
receive the object based on a request for the object being provided by the user device.

11. The non-transitory computer-readable medium of claim 7, further comprising:
one or more instructions that, when executed by the one or more processors, cause the one or more processors to:
implement the test environment within an operating system running on a virtual machine.

12. The non-transitory computer-readable medium of claim 7, where the user device is a first user device; and where the one or more instructions that, when executed by the one or more processors, further cause the one or more processors to:
receive the second behavior information from a second user device.

13. The non-transitory computer-readable medium of claim 7, where the user device is a first user device;
where the one or more instructions that, that cause the one or more processors to receive the second behavior information, cause the one or more processors to:
receive the second behavior information from the first user device; and
where the one or more instructions, that cause the one or more processors to determine the first behavior information, cause the one or more processors to:
determine the first behavior information based on the object being received by a second user device.

14. A method, comprising:
receiving, by a device, an object;
executing, by the device, the object in a test environment;
determining, by the device and based on executing the object in the test environment, first behavior information associated with the object;
receiving, by the device and based on at least one of opening, executing, running, or installing the object on a user device, second behavior information associated with the object,
the second behavior information identifying a behavior exhibited by the object when the object is at least one of opened, executed, run, or installed on the user device,
the second behavior information being determined for a threshold period of time, and
the second behavior information being received based on a deviation from the first behavior information being detected;
determining, by the device, that the first behavior information does not identify the behavior;
determining, by the device, that the object is a malicious object based on determining that the first behavior information does not identify the behavior and based on the second behavior information being different from the first behavior information; and
providing, by the device, an indication that the object is the malicious object based on determining that the object is the malicious object.

15. The method of claim 14, further comprising:
providing the object to the user device; and
where receiving the second behavior information comprises:
receiving the second behavior information from the user device based on providing the object to the user device.

16. The method of claim 14, where receiving the second behavior information comprises:
receiving the second behavior information periodically.

17. The method of claim 14, further comprising:
providing the first behavior information to the user device; and
where receiving the second behavior information comprises:
receiving the second behavior information from the user device based on providing the first behavior information to the user device.

18. The method of claim 14, further comprising:
receiving a memory snapshot associated with the object; and
establishing, based on receiving the memory snapshot, a memory space within the test environment to perform testing associated with the object.

19. The method of claim 14, further comprising:
receiving information associated with a user action; and
performing additional testing of the object based on receiving the information associated with the user action.

20. The device of claim 1, where the one or more processors are further to:
cause the object to be removed from the user device based on determining that the object is the malicious object.

* * * * *